United States Patent [19]
Motoyama et al.

[11] Patent Number: 5,092,287
[45] Date of Patent: Mar. 3, 1992

[54] FUEL INJECTING SYSTEM FOR TWO CYCLE ENGINE

[75] Inventors: Yu Motoyama; Masaki Ohsako; Keiichi Harada, all of Iwata, Japan

[73] Assignee: Yamaha Hatsudoki Kabushiki Kaisha, Iwata, Japan

[21] Appl. No.: 683,256

[22] Filed: Apr. 10, 1991

[30] Foreign Application Priority Data

Apr. 11, 1990 [JP] Japan ................... 2-93767

[51] Int. Cl.⁵ .................. F02D 41/34; F02B 33/04; F02M 51/00
[52] U.S. Cl. .................. 123/73 A; 123/73 C; 123/492
[58] Field of Search .............. 123/73 A, 73 B, 73 C, 123/73 CA, 73 CB, 478, 480, 492

[56] References Cited

U.S. PATENT DOCUMENTS

| | | | |
|---|---|---|---|
| 4,446,833 | 5/1984 | Matsushita et al. | 123/73 C X |
| 4,625,688 | 12/1986 | Takayasu | 123/73 C X |
| 4,917,053 | 4/1990 | Okazaki et al. | 123/73 A X |
| 4,960,097 | 10/1990 | Tachibana et al. | 123/73 A X |
| 4,984,540 | 1/1991 | Morikawa | 123/73 C |
| 5,005,533 | 4/1991 | Suzuki et al. | 123/73 A X |

FOREIGN PATENT DOCUMENTS

| | | | |
|---|---|---|---|
| 0027731 | 3/1978 | Japan | 123/73 A |
| 0158329 | 9/1984 | Japan | 123/73 A |

*Primary Examiner*—Willis R. Wolfe
*Attorney, Agent, or Firm*—Ernest A. Beutler

[57] ABSTRACT

A fuel injection system for a two cycle engine having main fuel injectors that inject directly into the engine combustion chambers and a sub or auxiliary fuel injector that injects into the induction system only under high load conditions to effect better piston cooling. Once the sub fuel injector begin to inject, then the amount of fuel per cycle injected by the main fuel injectors is decreased. The sub injector injects into a common manifold for a multiple cylinder engine and injects only one per crankshaft revolution.

14 Claims, 7 Drawing Sheets

FUEL INJECTING SYSTEM FOR TWO CYCLE ENGINE

BACKGROUND OF THE INVENTION

This invention relates to a fuel injection system and more particularly to an improved fuel injection system for two cycle engines.

The advantages of two cycle engines are well known. Their simplicity and the relatively high power output per crankshaft revolution makes these engines very desirable. However, one disadvantage of previously proposed two cycle engines is the somewhat poor fuel economy and high emission under certain conditions due to the porting of the engine. It has been proposed to improve the efficiency of a two cycle engine by incorporating direct cylinder injection. Either fuel injectors or air/fuel injectors have been proposed for this purpose.

Although direct fuel injection permits an improvement in fuel economy and emission control for two cycle engines, it does present some problem. In a conventional two cycle engine, a mixture of fuel and air is delivered to the crankcase chamber of the engine and then transferred to the combustion chamber for combustion. Hence, the fuel/air mixture is present both on the underside and on the head side of the piston and effective cooling is achieved under all running conditions. However, when direct fuel injection is employed, there is no cooling on the underside of the piston and direct injected engines must have their maximum power output limited to avoid problems due to this diminished cooling affect.

It is, therefore, a principal object of this invention to provide an improved fuel injection system for a two cycle engine that will permit the operation of the engine under high speed and load conditions without adverse thermal effects.

It is a further object to this invention to provide an improved fuel injection system for a two cycle engine that incorporate direct cylinder injection but also incorporates another injection system for cooling the underside of the piston under high speed, high load conditions.

It has been proposed to solve the aforenoted problem through the incorporation of a sub injection system in addition to a main injection system with the sub or auxuliary injection system supplying fuel to the engine through its induction system under high speed running conditions. Although the supply of additional fuel through the induction system under this condition can permit operation at high speeds and loads, some problems can exist with the previously proposed system. That is, with these systems it is important to insure that the introduction of additional fuel by the sub injector does not cause an overrich mixture in the engine during each cycle which could result in poor fuel economy and poor emission control. Furthermore, the control of the amount of fuel discharged by the respective injectors must be accurately controlled so as to avoid the deleterious affects.

It is, therefore, a principal object to this invention to provide an improved injection system for an engine embodying main and auxiliary fuel injectors and in which the amount of fuel injected by these injectors is accurately controlled so as to provide the optimum fuel under all running conditions.

It is a further object to this invention to provide an improved fuel injection system for a two cycle engine that permits optimum fuel control and efficiency under all running conditions while insuring good cooling under high speed and high load conditions.

Another problem in conjunction with direct cylinder injection, particularly in two cycle engines, is that the conditions in the combustion chamber vary significantly as the load changes. In addition, cylinder to cylinder variations and pressure can become quite large in multiple cylinder two cycle engines and this can affect the cylinder to cylinder fuel/air mixture. Obviously, unbalances in the fuel/air charge in the individual cylinders can adversely affect engine performance.

It is, therefore, a still further object to this invention to provide an improved fuel injection system that will insure against cylinder to cylinder fuel/air variations under all running conditions.

SUMMARY OF THE INVENTION

A first feature of this invention is adapted to be embodied in a fuel injection system for a crankcase compression internal combustion engine having a combustion chamber and an induction system including a crankcase chamber for delivering a charge to the combustion chamber. A first fuel injector injects fuel directly into the combustion chamber and a second fuel injector injects fuel into the induction system. Control means control the amount of fuel injected by each of the fuel injectors so that the second fuel injector injects fuel only when the engine speed and load are above the low load and low speed condition and the amount of fuel injected by the first fuel injector per cycle is decreased when the second fuel injector begins to inject fuel.

Another feature of the invention is adapted to be embodied in a fuel injection system for a multiple cylinder engine comprising a plurality of combustion chambers. A plurality of first fuel injectors, each discharged directly into a respective one of the combustion chambers. Means operate the first fuel injectors to effect a discharge of fuel during each single cycle of operation of the respective combustion chamber. An induction system is provided for supplying an air charge to each of the combustion chambers and has a common portion through which all of the flow to the several combustion chamber passes. A second fuel injector injects fuel into this common portion. Means are for provided for operating the second fuel injector to inject fuel only once during a cycle of all cylinders.

DETAILED DESCRIPTION OF THE PREFERRED EMBODIMENTS OF THE INVENTION

Figure 1:
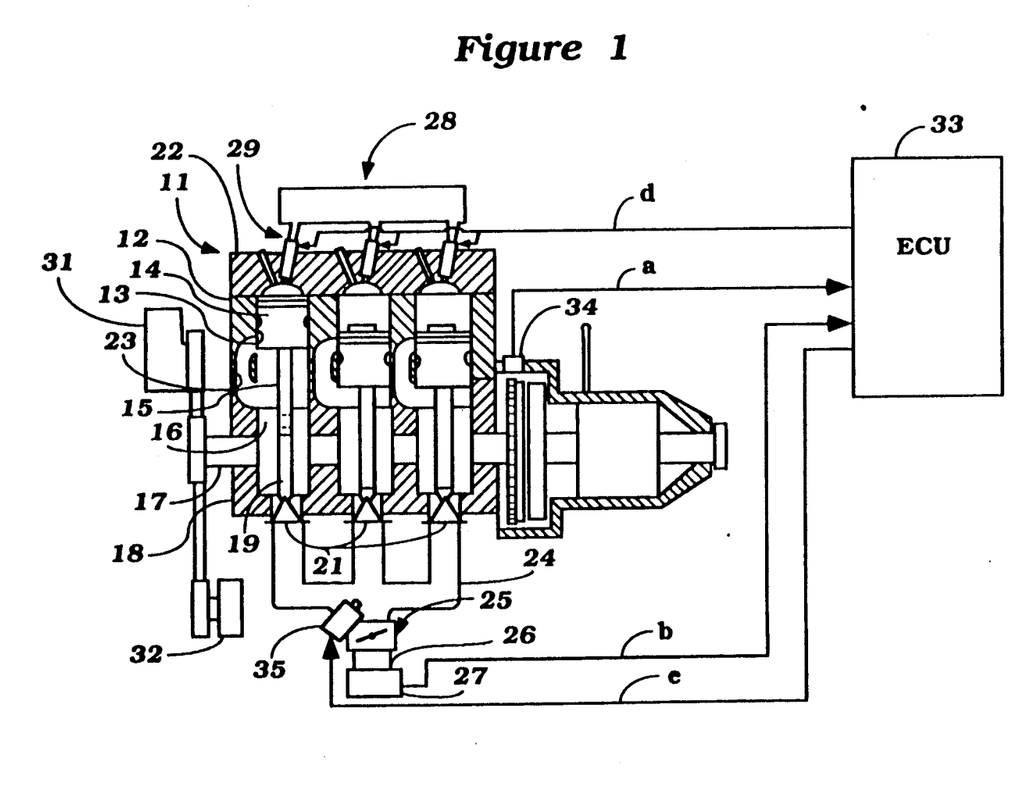
FIG. 1 is a partially schematic cross sectional view taken through the cylinders of a three cylinder inline internal combustion engine have a fuel injection system constructed in accordance with an embodiment of the invention.

Referring first to FIG. 1, a two cycle crankcase compression, three cylinder inline internal combustion engine having a fuel injection system constructed and operated in accordance with an embodiment of the invention is shown partially schematically and in cross sectional view through the cylinder bore. The invention is described in conjunction with an engine operating on the two stroke principal but certain facets of the invention may also be employed in four stroke engines. The invention, however, has particular utility in two stroke engines for the reasons aforenoted. Also, the invention, although described in conjunction with a three cylinder inline engine, may be employed with engines having other cylinder numbers and other cylinder disposition. Certain facets of the invention, however, have particular utility with multiple cylinder engines, as will become readily apparent.

The engine 11 has been shown in a generally schematic fashion and the exact details of its internal construction may be of any known type since the invention deals primarily with the injection system. However, the engine in the illustrated embodiment includes a cylinder block 12 in which three aligned cylinder bores 13 are formed. Pistons 14 reciprocate in each of the cylinder bores 13 and are connected by means of connecting rods 15 to the individual throws 16 of a crankshaft 17. The crankshaft 17 is rotatably journaled within a crankcase defined by the cylinder block 12 and a crankcase number 18 which is affixed to the cylinder block 12 in a known manner. As is typical with two cycle practice, the crankcase chamber is divided into individual chambers 19, each of which is sealed from the other and which is associated with the respective cylinder bore 13.

An intake charge is delivered to each crankcase chamber 19 by an induction system, to be described, through individual check valves 21 provided in each chamber 19 so as to preclude reverse flow. This charge is compressed on downward movement of the pistons 15 and then is transferred to a combustion chamber formed above the heads of the pistons 14 by means including a cylinder head 22 through one or more scavenge passages 23.

The induction system includes an intake manifold 24 having individual runners serving each of the crankcase chambers 19 and in which the check valves 21 are positioned. A throttle valve 25 is provided in a common portion of the intake manifold 24 upstream of the individual runners and which may be disposed above a plenum chamber. An intake device 26 provides atmospheric air to the throttle valve 25 and an air flow detector 27 is positioned in the intake device 26. The air flow detector 27 provides an indication of engine load, as is well known. Rather than employing an air flow detector, the system may also employ a throttle position detector for detecting the position of the throttle valve 25 as throttle valve position is also indicative of load.

The engine 11 is also provided with a main fuel/air injection system, indicated generally by the reference numeral 28 and which is comprised of individual air/fuel injectors 29 each associated with a respective one of the combustion chambers. Although the invention is described in conjunction with an air/fuel injection system, it is to be understood that certain facets of the invention may be employed with injectors that inject only fuel. Although any known type of fuel/air injection system may be employed, the fuel/air injection system may have a construction of the type shown in my co-pending application entitled "Two Cycle Internal Combustion Engine", U.S. Ser. No. 508 924, filed Apr. 12, 1990 and assigned to the assignee hereof.

The air/fuel injection system 28 receives pressurized air from an air compressor 31 driven by the engine crankshaft 17 and fuel from a pressure fuel pump 32 also driven by the engine crankshaft 17. The control of the fuel/air injector system 28 is done by a control system including a electronic control unit, indicated schematically at 33. The ECU receives a signal "a" indicative of engine speed and crank angle by means of a crankshaft rotational speed sensor 34 and a signal "b" indicative of engine load from the air flow sensor 27. The ECU outputs a signal "d" to the individual fuel injectors 29 so as to control their injection timing and duration.

In accordance with the invention, the engine 11 is also provided with a sub or auxiliary fuel injector 35 which injects fuel into the induction system preferably at a point in the common air flow to the individual crankcase chambers 19 and is controlled by the ECU signal "e". This may be either immediately downstream of the throttle valve 25 as shown in FIG. 1 or upstream of it. Certain facets of the invention may be employed, however, in conjunction with arrangements wherein there is provided a sub fuel injector that injects somewhere else into the induction system for each cylinder such as into its crankcase chamber 19 or the scavenge passage 23. These locations would require separate sub injectors for each cylinder but certain advantages of the invention can be employed through the use of such a plurality of sub injectors.

Figure 3:
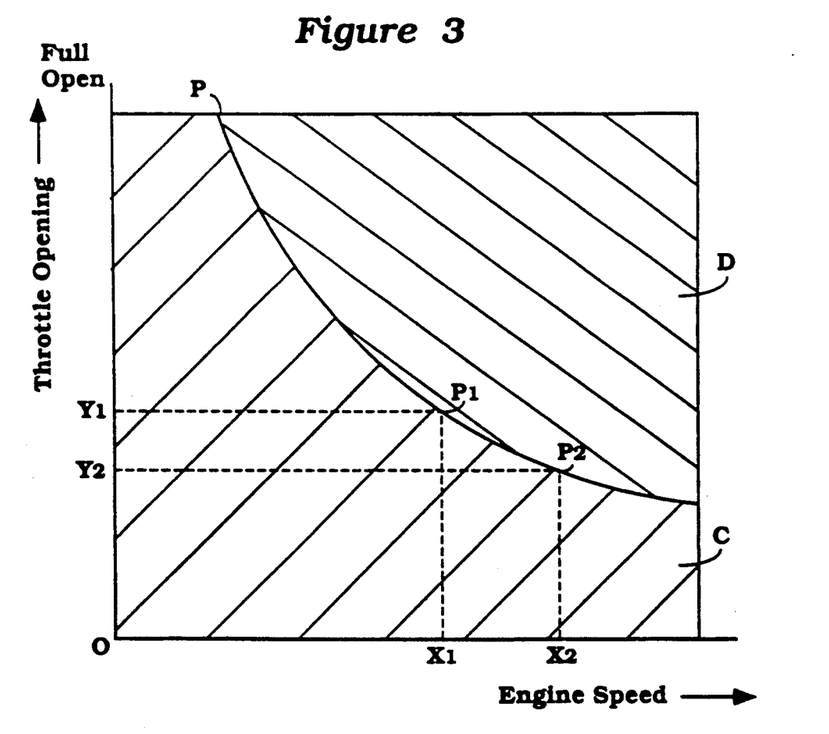
FIG. 3 is a graphical view showing a map of the fuel supply versus engine speed and throttle opening.
Figure 4:
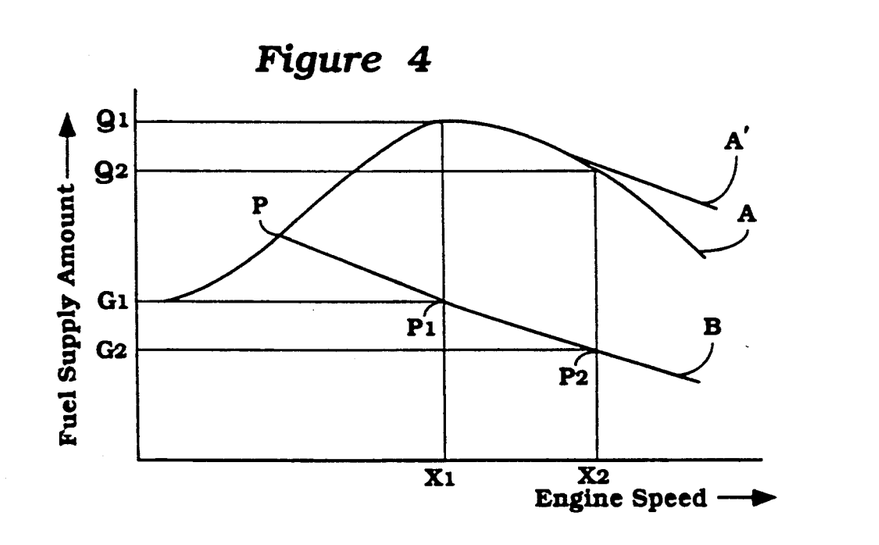
FIG. 4 is a graphical view showing the fuel supply in relation to engine speed at wide open throttle.

The control strategy will now be described by particular reference to FIGS. 2 through 6 with initial emphasis being on FIGS. 2 through 4. Basically, the strategy is such that at low engine speeds and low engine loads the sub injector 35 does not supply any fuel and all of the fuel requirements for the engine are supplied by the main fuel injectors 29. The curve of FIG. 3 shows the relationship of engine speed and throttle opening to the various fuel supplied. The area C of the curve shows the conditions when all of the fuel supply is provided by the main fuel injectors 29 while the curve portion D shows the condition when fuel is also supplied by the sub injector 35. As long as the operation is below the curve P all fuel will be supplied by the main fuel injectors 29. However, as the speed and/or throttle opening pass over this point than the sub injector 35 will begin to initiate fuel supply. At the same time, the incremental fuel supply furnish by the main fuel injectors 29 will be slightly reduced per cycle of operation.

Figure 2:
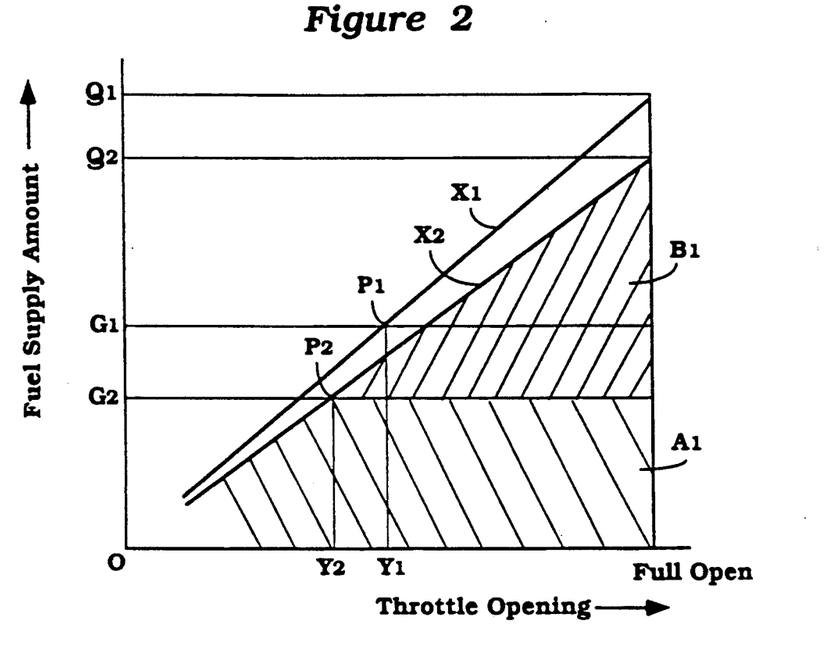
FIG. 2 is a graphical view showing the amount of fuel supplied to the engine under various throttle conditions.

The family of curves in FIG. 2 show the fuel supply provided by the main fuel injectors 29 ($A_1$) and the total amount of fuel supplied by the sub fuel injector 35 ($B_1$) at various throttle openings and with various speed curves shown as the curves $X_1$ and $X_2$ with $X_1$ being a lower speed than $X_2$. FIG. 4 shows the fuel supply amount per cycle of operation as engine speed increases. The curve B shows the amount of fuel supplied per cycle by the main fuel injectors 29 while the curve A shows the total fuel supply requirements for the engine. The curve of FIG. 4 is a full throttle curve.

As may be seen from this figure, when the speed increases above the speed at the point P toward the speed $X_1$, the amount of fuel supplied by the main fuel injectors 29 per cycle decreases along the curve B while the amount of fuel supplied by the sub injector 35 increases so as to bring the total fuel up to the curve A. After the speed $X_1$ is reached at full throttle, the amount of fuel supplied by the sub fuel injector 35 relative to the amount of fuel supplied by the main fuel injectors 29 remain substantially constant. Although the total fuel requirements fall per cycle when the speed increases above the speed $X_2$ it may be possible to keep the total fuel supply as shown by the curve $A^1$ for simplicity and control purposes.

By increasing the amount of fuel supplied by the sub injector 35 as the speed and load increases, than a greater amount of cooling on the underside of the piston will result and engine protection will be maximized. In addition to improve the cooling of the engine, the fuel control system also minimizes cylinder to cylinder variations, particularly under high speed and high load conditions. As has been previously noted, two cycle engines having multiple cylinders are particularly prone to such cylinder to cylinder variation.

Figure 5:
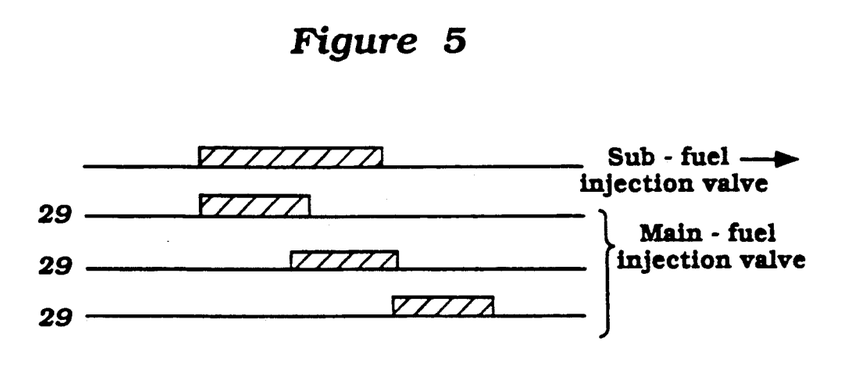
FIG. 5 is a diagrammatic view showing the period of operation of the sub fuel injector and main fuel injectors during a single cycle of operation and when all fuel injectors are supplying fuel.

Referring now to FIG. 5, the fuel injection timing under a specific high speed, high load condition is shown per single rotation of the crankshaft 17. It will be noted that each of the main fuel injectors $29_1$, $29_2$ and $29_3$ injects for a preset duration of crank angle as set by the ECU in their timing sequence depending upon the firing order. However, the sub fuel injector 35 injects for a fixed duration only one time during this crankshaft revolution. This is possible because the sub fuel injector 35 discharges into the common portion of the intake manifold 24 and hence the charge will be equally distributed among the cylinders. Because a greater amount of fuel is supplied through the sub fuel injector 35 as the load and speed increase than through the main fuel injectors 29, the likelihood of cylinder to cylinder variation will be substantially minimized.

Figure 6:
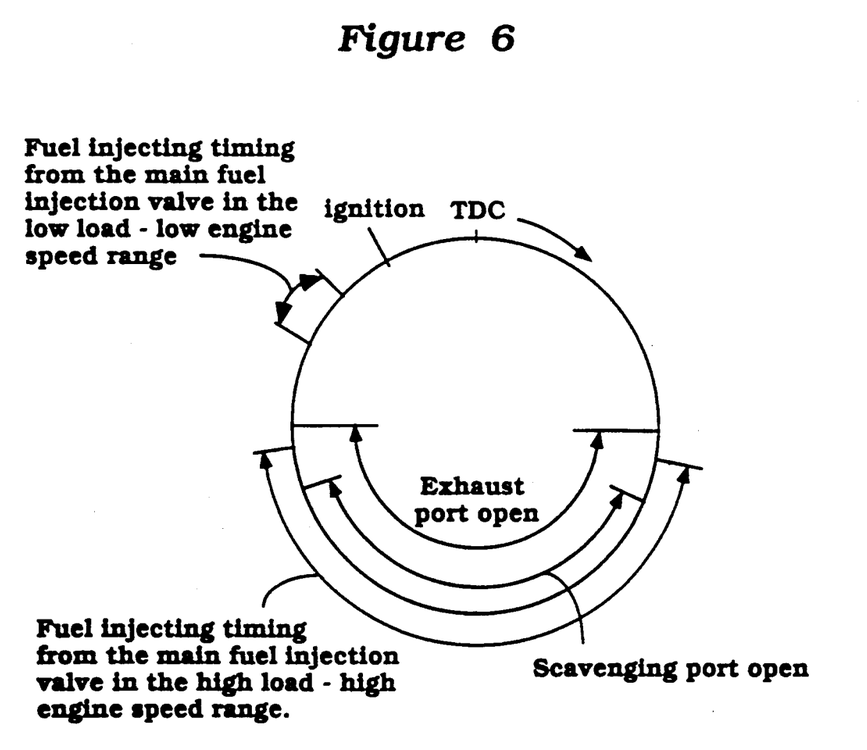
FIG. 6 is a graphical view showing the fuel injection timing versus crankshaft revolution and port opening.

FIG. 6 shows the timing of the injection from the main fuel injectors 29 during low speed, low load running and high speed, high load running. As may be seen, injection from the main fuel injector in the low speed, low range condition occurs immediately before the firing of the spark plug and long after the exhaust port has closed. As a result, there will be no fuel loss during the scavenging cycle. However, as the engine moves into the high load, high speed condition, fuel injection timing is advanced and the duration is increased so that the fuel injection begins after the exhaust port opens and terminates at about the time the exhaust port closes. However, due to the high speed operation substantially no fuel will be swept out of the exhaust port.

Figure 7:
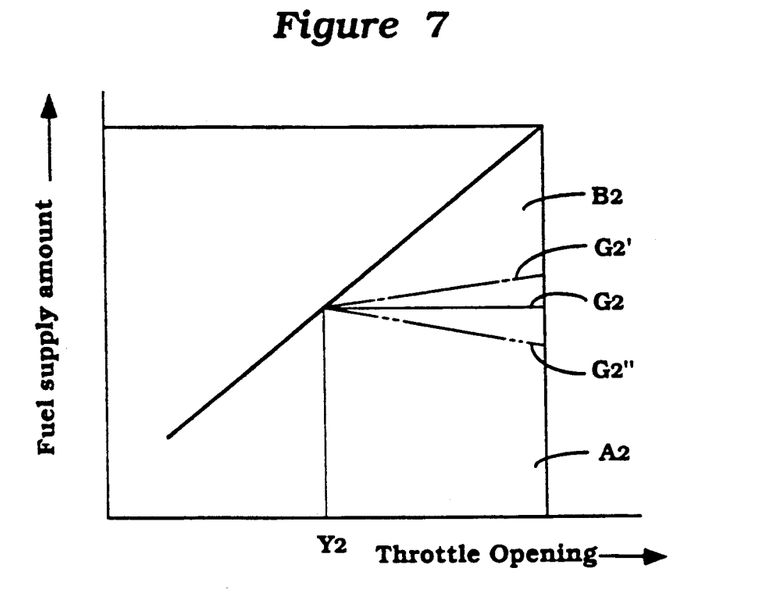
FIG. 7 is a graphical view showing possible variances in the fuel supply in relation to throttle opening.
Figure 8:
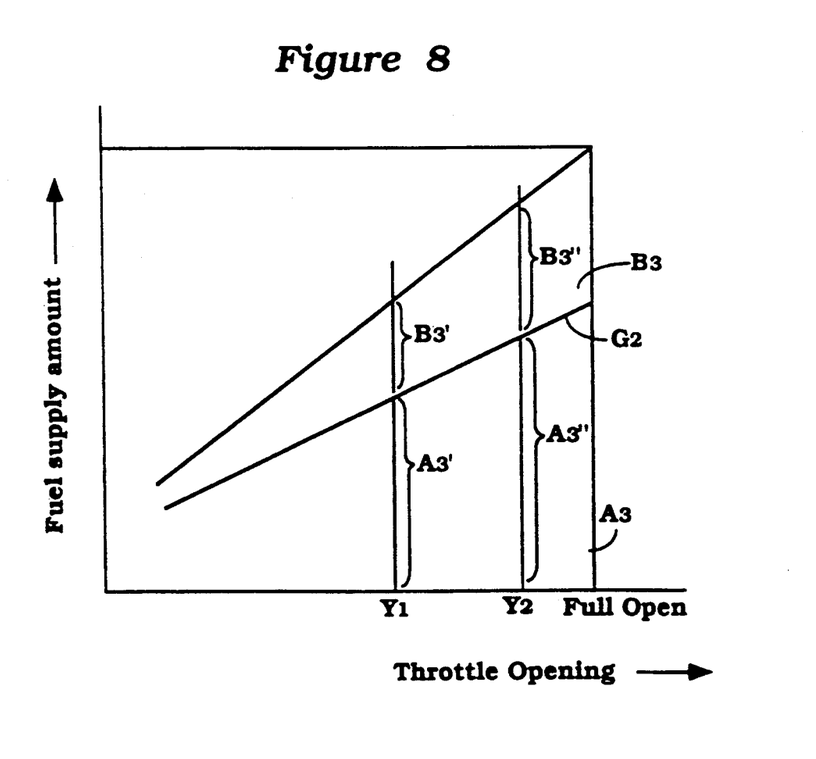
FIG. 8 is another graphical view showing another embodiment in the relationship of fuel supply by the individual fuel injectors in response to variations in throttle opening.

In the embodiment thus far described, the amount of fuel supplied by the main fuel injector once the sub fuel injector begins to operation has been held relatively constant with time although it has been decreased per cycle when the speed is increased. Such a curve is also shown by the curve $G_2$ in FIG. 7. However, the amount of fuel supplied by the main fuel injectors 29 may be increased slightly as shown by the curve $G_2'$ or decreased slightly by the curve $G_2''$. Also, as shown in FIG. 8, the amount of fuel injected by the main fuel injectors 29 and auxiliary injector 35 may be varied so as to maintain a constant ratio between these fuel injection amounts. However, in all instances it is desirable to reduce the amount of fuel injected per cycle by the main fuel injectors 29 once the sub fuel injector 35 begins to inject fuel under the higher load and speed conditions.

Figure 9:
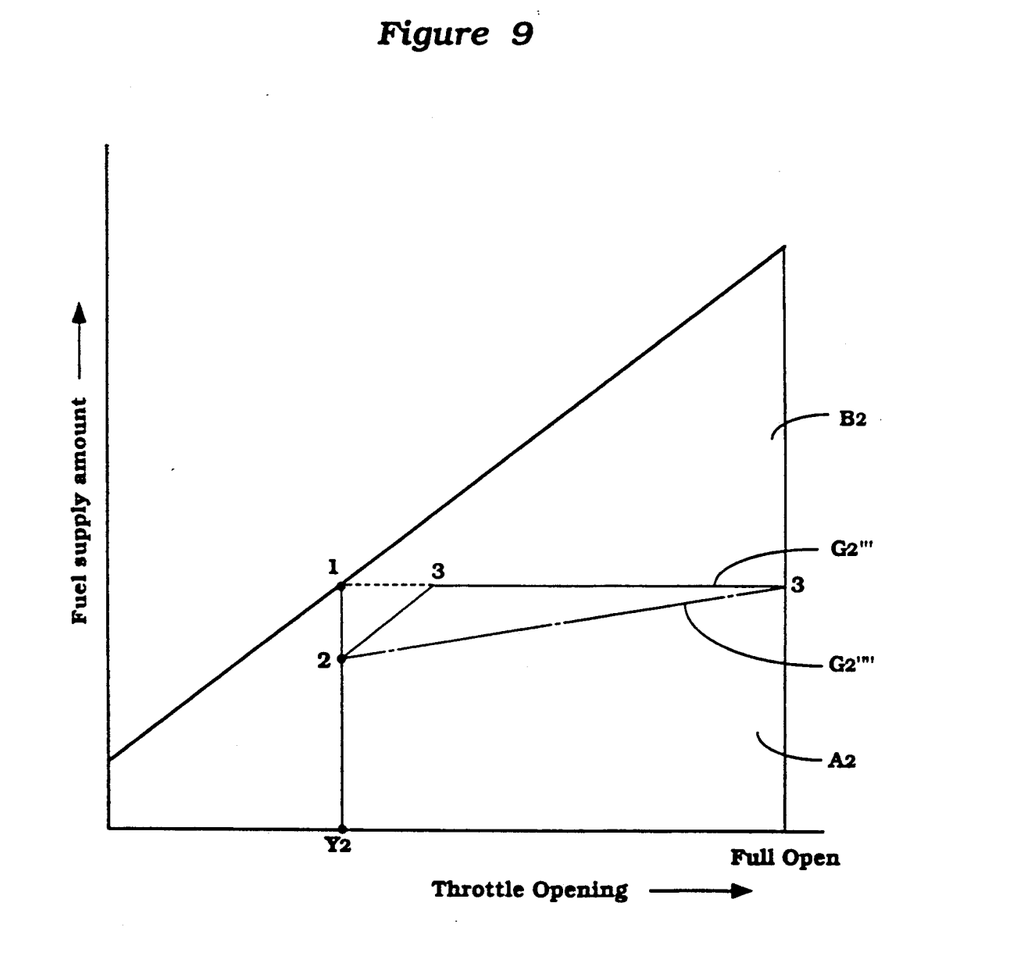
FIG. 9 is a graphical view, in part similar to FIG. 7, showing another arrangement for varying the fuel supply in relation to throttle opening.

FIG. 9 is a graphical view showing a control routine which may be practiced in conjunction with the invention and shows the significance of the decreasing of the amount of fuel supplied by the main fuel injectors 29 during each cycle once the sub fuel injector 35 begins to supply fuel. As may be seen, the program begins at the point 1 when the engine is operating at the curve P as shown in FIG. 3. If the speed and/or throttle opening increase slightly to bring the program into the domain where the sub fuel injector 35 begins to operate, then the amount of fuel supplied by the main fuel injector 29 is reduced to the point 2 with the extra fuel being supplied by the sub fuel injector 35. The amount of reduction is chosen so that it equals the minimum quantity of fuel which may be injected by the sub fuel injector 35 at a controlled manner. As the engine load increases from the point 2 to the point 3, than the amount of fuel supplied by the main fuel injector is increased up to its maximum point while the amount of fuel supplied by the sub fuel injector is maintained constant. Because of this arrangement, it will be insured that none of the fuel supplied by the sub fuel injector will pass out of the exhaust port during the scavenging cycle. Once the point 3 is reached and the load continues to increase, then the amount of fuel supplied by the main fuel injector is held constant as shown by the curve $G_2'''$. Of course, the amount of fuel supplied by the main fuel injector may, rather than being increased to its maximum at a point before wide open throttle may be increased gradually as shown by the dot-dash curve $G_2''''$. If desired, when the engine load increases above the throttle opening $Y_2$ the main fuel injectors 29 may supply full fuel flow to the point 1 up until the lag of delivery from the sub fuel injectors has been overcome.

Figure 10:
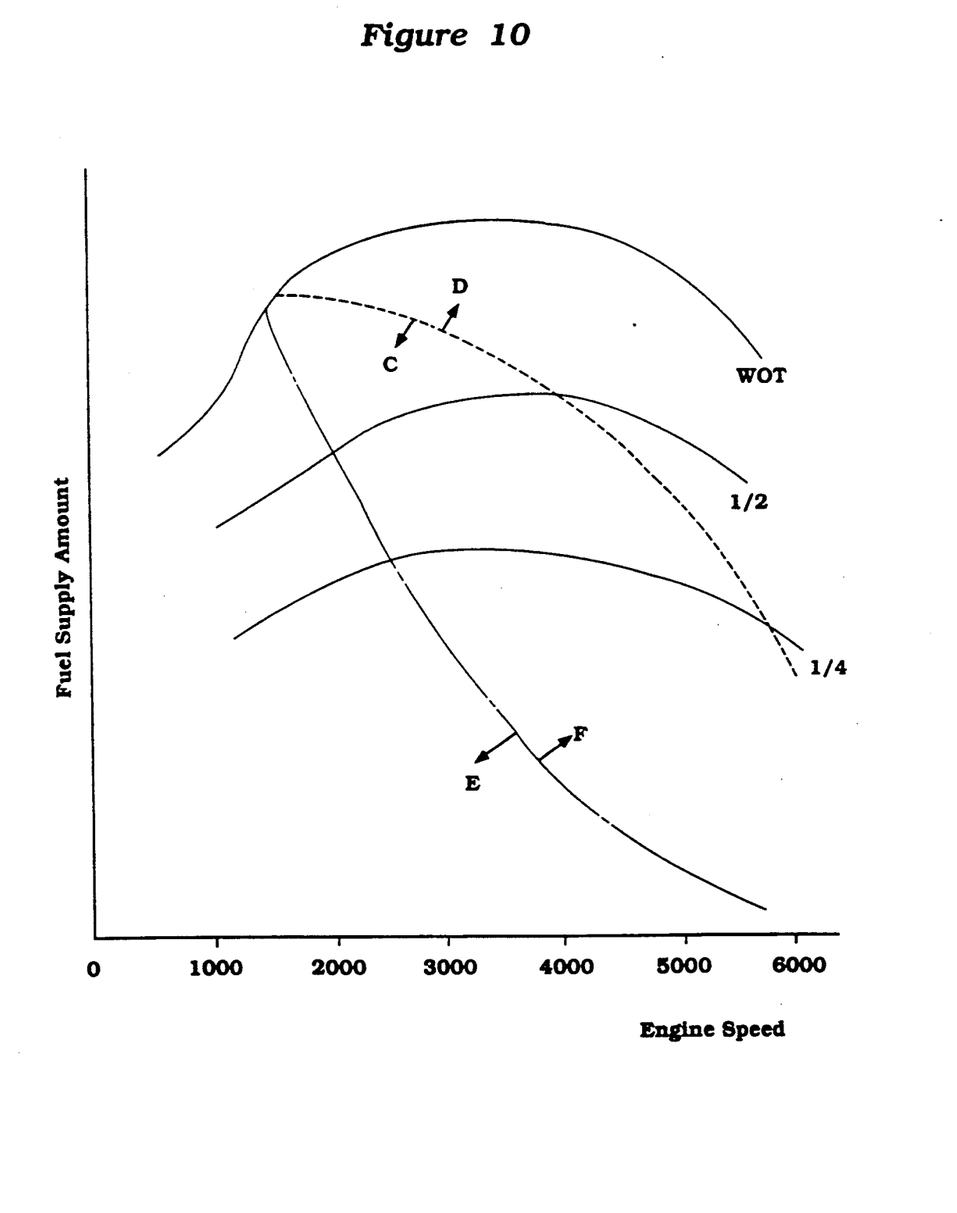
FIG. 10 is a graphical view showing a family of curves in relation to fuel supply, engine speed and throttle opening.

Further explaining the theory of the invention, FIG. 10 shows a family of curves for difference of the fuel supply amount in relation to engine speed at a variety of throttle openings. The broken curve shows the demarcation point between when fuel is supplied only by the main fuel injectors 29 as shown on the side C while the side D of the curve indicates the region wherein fuel is supplied by both the main and sub fuel injectors. The dot-dash curve shows the timing of injection from the main fuel injector. The side of the curve indicated at E is the period when the main fuel injector injects only after the exhaust port is closed and this represents the area shown in FIG. 6. The side of the curve F shows the operation when the main fuel injector injects fuel when the exhaust port is open as also shown in FIG. 6.

It should be readily apparent from the foregoing description that the described embodiments are effective in providing good cooling for the piston under all load and speed ranges, good fuel efficiency and good exhaust emission control for a two cycle engine. In addition, the injector arrangement employing a sub fuel injector that injects into an intake manifold for a multiple cylinder engine, permits these advantages to be achieved through relatively low cost and also to avoid cylinder to cylinder variations in fuel mixture strength under high speed and high load conditions. Of course, the foregoing description is that of preferred embodiments of the invention and various changes and modifications may be made without departing from the spirit and scope of the invention, as defined by the appended claims.

We claim:

1. A fuel injection system for a crankcase compression internal combustion engine having a combustion chamber, an induction system including a crankcase chamber for delivering a charge to said combustion chamber, a first fuel injector for injecting fuel directly into said combustion chamber, a second fuel injector for injecting fuel into said induction system, and control means for controlling the amount of fuel injected by each of said fuel injectors so that said second fuel injector injects fuel only when the engine speed and load are above low speed, low load conditions and the amount of fuel injected by said first fuel injector per cycle is decreased at the time when said second fuel injector begins injecting fuel.

2. A fuel injection system as set forth in claim 1 wherein the amount of fuel injected by the first fuel injector per cycle is further decreased as the load or speed increase after the second fuel injector begins injecting fuel.

3. A fuel injection system as set forth in claim 2 wherein the ratio of fuel supplied by the second fuel injector to the first fuel injector increases as the engine speed and load increase.

4. A fuel injection system as set forth in claim 2 wherein the ratio of fuel supplied by the second fuel injector to the first fuel injector is maintained constant as the engine speed and load increases.

5. A fuel injection system as set forth in claim 1 wherein in at least one of the fuel injectors comprises a fuel/air injector.

6. A fuel injection system as set forth in claim 5 wherein the first fuel injectors are fuel/air injectors.

7. A fuel injection system as set forth in claim 1 wherein there are a plurality of combustion chambers each having a respective first fuel injector.

8. A fuel injection system as set forth in claim 7 further including an intake manifold for supplying an air charge to the induction systems of the combustion chambers and having a common portion into which fuel is injected by the second fuel injector.

9. A fuel injection system as set forth in claim 8 wherein each of the main fuel injectors injects fuel for a duration of each cycle of operation of the respective combustion chamber and the second fuel injector injects fuel only once during a complete cycle of operation of all of the combustion chambers.

10. A fuel injection system as set forth in claim 7 wherein the amount of fuel injected by the first fuel injector per cycle is increased as the load or speed increase after the second fuel injector begins injecting fuel.

11. A fuel injection system as set forth in claim 7 wherein the ratio of fuel supplied by the second fuel injector to the first fuel injector increases as the engine speed and load increase.

12. A fuel injection system as set forth in claim 7 wherein the ratio of fuel supplied by the second fuel injector to the first fuel injector is maintained constant as the engine speed and load increases.

13. A fuel injection system for a multi-cylinder engine comprising a plurality of combustion chambers, a plurality of first fuel injectors each injecting directly into a respective one of said combustion chambers, means for operating said first fuel injectors to effect a discharge of fuel during a single cycle of operation of the respective combustion chamber, an induction system for supplying an air charge to each of said combustion chambers and having a common portion through which all air to the several combustion chambers passes, a second fuel injector for injecting fuel into said common portion, and means for operating said second fuel injector to inject fuel only once during a complete cycle of all of the combustion chambers.

14. A fuel injection system as set forth in claim 13 wherein the engine comprises a two cycle crankcase compression engine and the second fuel injector injects fuel only once during a single rotation of the crankshaft.

* * * * *